(12) United States Patent
Hatton

(10) Patent No.: US 7,202,286 B2
(45) Date of Patent: *Apr. 10, 2007

(54) UV-CURABLE COMPOSITIONS

(75) Inventor: Kevin B Hatton, Bishops Stortford (GB)

(73) Assignee: Huntsman Advanced Materials Americas Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/054,208

(22) Filed: Feb. 8, 2005

(65) Prior Publication Data

US 2005/0171228 A1   Aug. 4, 2005

Related U.S. Application Data

(63) Continuation of application No. 10/088,564, filed as application No. PCT/EP00/08748 on Sep. 7, 2000, now Pat. No. 6,855,748.

(30) Foreign Application Priority Data

Sep. 16, 1999 (GB) ............................... 9921779.6

(51) Int. Cl.
C08F 2/46 (2006.01)
C08F 2/50 (2006.01)

(52) U.S. Cl. .................... 522/168; 522/170; 522/178; 522/181

(58) Field of Classification Search ................ 522/168, 522/170, 167, 182
See application file for complete search history.

(56) References Cited

U.S. PATENT DOCUMENTS

| | | | |
|---|---|---|---|
| 3,835,003 A | 9/1974 | Schlesinger | |
| 3,849,137 A | 11/1974 | Barzynski et al. | |
| 3,991,033 A | 11/1976 | Sam | |
| 4,058,400 A | 11/1977 | Crivello | |
| 4,058,401 A | 11/1977 | Crivello | |
| 4,086,210 A | 4/1978 | Petropoulos | |
| 4,299,938 A | 11/1981 | Green et al. | |
| 4,339,567 A | 7/1982 | Green et al. | |
| 4,368,256 A | 1/1983 | Mollet et al. | |
| 4,383,025 A | 5/1983 | Green et al. | |
| 4,398,014 A | 8/1983 | Green et al. | |
| 4,518,676 A | 5/1985 | Irving | |
| 4,618,564 A | 10/1986 | Demmer et al. | |
| 4,736,055 A | 4/1988 | Dietliker et al. | |
| 5,463,084 A | 10/1995 | Crivello et al. | |
| 5,674,922 A | 10/1997 | Igarashi et al. | |
| 5,721,020 A | 2/1998 | Takami | |
| 5,882,842 A | 3/1999 | Akaki et al. | |
| 5,981,616 A * | 11/1999 | Yamamura et al. | 522/168 |
| 6,084,004 A | 7/2000 | Weinmann et al. | |
| 6,096,796 A | 8/2000 | Watanabe et al. | |
| 6,166,101 A | 12/2000 | Takami | |
| 6,287,745 B1 | 9/2001 | Yamamura et al. | |
| 6,365,644 B1 * | 4/2002 | Yamamura et al. | 522/168 |

FOREIGN PATENT DOCUMENTS

| | | |
|---|---|---|
| EP | 199672 A | 4/1986 |
| EP | 0 848 292 A1 | 6/1998 |
| EP | 0 848 294 A | 6/1998 |
| EP | 0 897 710 A2 | 2/1999 |
| EP | 0 938 026 A1 | 8/1999 |
| GB | 1516351 | 7/1978 |
| GB | 1539192 | 1/1979 |
| JP | 11 152441 A | 6/1999 |
| JP | 11 181391 A | 7/1999 |
| WO | WO 00 63272 | 10/2000 |

OTHER PUBLICATIONS

Saski et al., "Photoinitiated Cationic Polymerization of Oxetane Formulated with Oxirane", J. Polymer Sci. Part A: Polym. Chem. 33:1807-1816 (1995).

* cited by examiner

*Primary Examiner*—Sanza L. McClendon

(57) ABSTRACT

The present invention relates to UV-curable compositions, the process for preparing the compositions and to the use of the curable compositions. The compositions contain: a) at least one oxetane compound; b) at least one polyfunctional cycloaliphatic epoxy compound; c) at least one multifunctional hydroxy compound; and d) at least one curing agent.

3 Claims, No Drawings

UV-CURABLE COMPOSITIONS

This application is a continuation of Ser. No. 10/088,564, filed Jul. 1, 2002 now U.S. Pat. No. 6,855,748, which is a 371 of PCT/EP00/08748 filed Sep. 7, 2000, herein incorporated by reference in their entirety.

The present invention relates to UV-curable compositions, the process for preparing the compositions and to the used of the curable compositions.

Sasaki et al. J. Polym. Sci. Part A: Polym. Chem. 33, 1807–1816 (1995) report that the UV initiated cationic polymerisation of mixtures of epoxy resins and oxetanes shows faster cure speed then the individual components alone. The U.S. Pat. Nos. 5,721,020, 5,882,842 and 5,674,922 describe the use of formulations which contain oxetane compounds to produce UV and electron beam curing systems. It is also known that cycloaliphatic epoxy resins show an increase in cure speeds when formulated with multifunctional hydroxy compounds.

EP-A-0 848 294 describes photocurable resin compositions used for photo-fabrication of three-dimensional objects comprising (A) an oxetane compound, (B) a polymeric epoxy compound having a number average molecular weight of 1000 to 20000, e.g. epoxidated polybutadiene products, and (C) a cationic photo-initiator. Said resin compositions may optionally comprise an epoxy resin different from component (B) including a polyfuctional cycloaliphatic epoxy resin. Furthermore these resin compositions may comprise a polyol for developing the photocurability of the compositions.

It has now surprisingly been found, that certain specific mixtures of cycloaliphatic epoxy resins, oxetanes and multifunctional hydroxy compounds are more reactive and show faster cure speeds even with very low levels of UV cationic photoinitiators. Such compositions when formulated additionally with a cationic photoinitiator show faster cure speed at low levels of photoinitiator when compared with formulations containing no oxetane or oxetane containing formulations which contain cycloaliphatic epoxy compounds or multifunctional hydroxy compounds alone.

The present invention relates to a curable composition comprising
a) at least one oxetane compound;
b) at least one polyfunctional cycloaliphatic epoxy compound;
c) at least one multifunctional hydroxy compound, and
d) at least one curing agent.

This invention allows for the formulation of UV photo-initiated cationically curable systems with fast cure speeds.

The invention, therefore, allows for the preparation of formulations for UV-photoinitiated cationically curable systems with fast cure speeds.

A preferred embodiment of the invention relates to a curable composition comprising
a) at least one oxetane compound of the formula

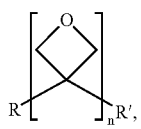

(I)

wherein R and R' independently of one another represent aliphatic, cycloaliphatic, aromatic or araliphatic groups and n represents an integer from one to four;
b) at least one polyfunctional cycloaliphatic epoxy compound containing a group of the formula

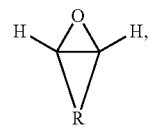

(II)

wherein R is a straight chain C2–C6 alkylene group, and
c) at least one multifunctional hydroxy compound $$Q(OH)_n \quad (III),$$

in which Q represents an aliphatic, cycloaliphatic or araliphatic group and n an integer from 2 up to 128; and
d) at least one curing agent.

Component a)

The oxetane resin is preferably liquid at room temperature and corresponds to compounds of the formula

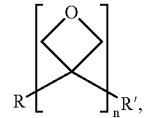

(I)

wherein R and R' independently of one another represent aliphatic, cycloaliphatic, aromatic or araliphatic groups and n represents an integer from one to four. When R and/or R' represent an aliphatic group, it may be straight or branched chain $C_1$–$C_{12}$ alkylene group.

Cycloaliphatic groups R and/or R' are preferably $C_5$–$C_8$ cycloalkylene groups in which the cycloalkylene ring may be substituted by substituents such as $C_1$–$C_4$ alkyl groups, or several cycloalkylene residues may be bonded together via a bridge member, e.g. a methylene bridge.

Aromatic residues are preferably optionally ring-substituted phenyl residues or naphthyl residues.

Araliphatic residues are preferably optionally ring-substituted benzyl residues or naphthyl methylene residues. The groups R and/or R' may also contain heteroatoms such as oxygen.

Some preferred oxetane resins include but are not limited by the following:

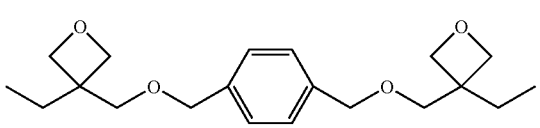

3,3'-[1,4-phenylene-bis(methyleneoxymethylene)]-bis(3-ethyloxetane),

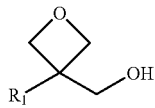

$R_1$=Methyl:3-methyl-3-oxethanemethanol;   $R_1$=Ethyl:3-ethyl-3-oxethanemethanol

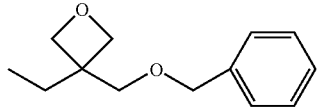

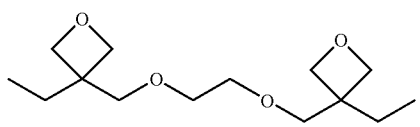

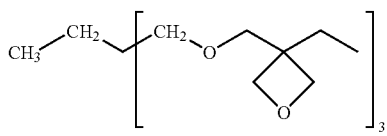

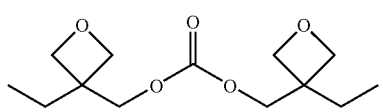

Component b)

The polyfunctional cycloaliphatic epoxy compound preferably is represented by the formula:

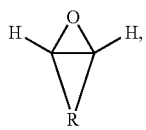

(II)

wherein R is a straight chain $C_2$–$C_6$ alkylene group, especially $C_4$-alkylene which may be substituted by additional substituents. These epoxy resins may be formed by reaction of peracetic acid with olefinic esters of cycloaliphatic compounds. Some preferred cycloaliphatic epoxy resins are diepoxides and include but are not limited by the following:

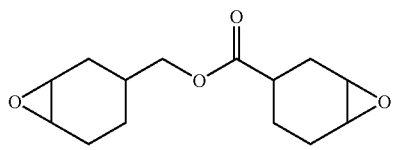

7-oxabicyclo[4.1.0]hept-3-ylmethyl ester-7-oxabicyclo[4.1.0]heptane-3carboxylic acid

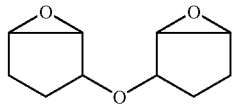

2,2'-oxy-bis(6-oxabicyclo[3.1.0]hexane)

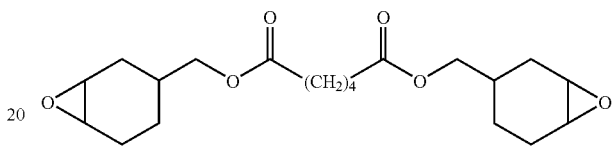

bis(7-oxabicyclo[4.1.0]hept-3-yl)-methyl ester hexanedioic acid

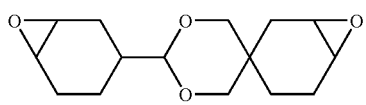

2-(3,4-epoxycyclohexyl-5,5-spiro)-(3,4-epoxy)cyclohexane-m-dioxane.

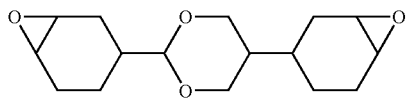

3,3'-(1,3-dioxane-2,5-diyl)-bis(7-oxabicyclo[4.1.0]heptane)

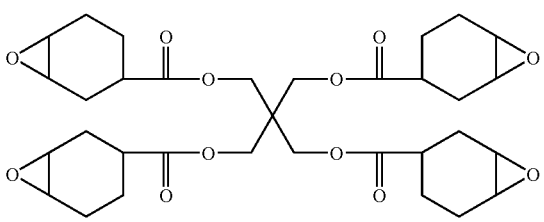

2,2-bis[(7-oxabicyclo[4.1.0]hept-3-ylcarbonyloxy)-methyl]-1,3-propanediyl ester-7-oxabicyclo[4.1.0]heptane-3–Carboxylic acid Diepoxides containing non-terminal epoxide groups may also be employed such as vinylcyclohexene dioxide, limonene dioxide, dicyclopentadiene oxide, 4oxatetracyclo[6,2,1,0$^{2.7}$0$^{3.5}$]undec-9-yl glycidyl ether, bis(4-oxatetracyclo[6,2,1,0$^{2.7}$0$^{3.5}$]undec-9-yl)ether of ethylene glycol, 3,4-epoxycyclohexylmethyl-3,4-epoxycyclohexanecarboxylate and its 6,6$^1$-dimethyl derivative, bis(3,4-epoxycyclohexanecarboxylate) of ethylene glycol or 3-(3,4-epoxycyclohexyl)-8,9-epoxy-2,4dioxaspiro[5,5]undecane.

Component c)

The multifunctional hydroxyl compounds are those having the formula:

Q(OH)$_n$ (III), in which Q is an aliphatic, cycloaliphatic or araliphatic residue and n are integers from 1 up to 128. When Q is an aliphatic residue, it may be a straight or branched chain C$_2$–C$_{12}$alkylene residue.

Cycloaliphatic residues Q are preferably C$_5$–C$_8$cycloalkylene residues in which the cycloalkylene group may be substituted by substituents such as C$_1$–C$_4$alkyl or several cycloalkylene residues may be bonded together via a bridge member, e.g. a methylene bridge.

Araliphatic residues are preferably optionally ring-substituted benzyl residues or naphthyl methylene residues.

Each of the residues Q may be substituted or interrupted provided that the substituent groups or interrupting atoms do not deactivate the heterogeneous catalyst, or undergo competing reactions with the liquid epoxy. Examples of suitable substituent groups are ester groups as contained in polycaprolactones and unsaturated groups as contained in hydroxy-terminated polybutadienes or polybutadiene polymers.

The alcohols mentioned above may be substituted by alkoxy groups as well as higher polyoxyethylene glycol, polyoxypropylene glycol, polyoxytetramethylene glcol and polycaprolactone groups based on such alcohols.

Specific examples of preferred aliphatic hydroxy compound reactants of formula I (where n=1) include methanol, ethanol, propanol, butanol and such straight chain or branched alcohols up to and including C$_{12}$alkanols.

Specific examples of cycloaliphatic alcohols include cyclopentanol, cyclohexanol and cycloheptanol as well as such alcohols substituted by C$_1$–C$_4$alkyl and/or alkoxy groups.

Araliphatic alcohols which may be mentioned include benzyl alcohol and phenoxy ethanol both which may have ring substitution such as C$_1$–C$_4$alkyl and/or alkoxy groups, halogens such as F, Cl, Br, I or other groups provided that the substituent groups do not deactivate the heterogeneous catalyst, or undergo competing reactions with the liquid epoxy.

Specific examples of preferred aliphatic dihydroxy compounds reactants of formula I (where n=2) include ethylene glycol, diethylene glycol, triethylene glycol and higher polyoxyethylene glycols; propane-1,2-diol; propane-1,3-diol and higher propoxylene glycols; butane-1,4-diol and higher polyoxytetramethylene glycols; polycaprolactone diols; neopentyl glycol; pentane-1,5-diol; hexane-1,6-diol and octane-1,8-diol.

Specific examples of preferred cycloaliphatic diols are e.g. quinitol, resorcitol, bis (4-hydroxycyclohexyl) methane, 2,2-bis(4-hydroxycyclohexyl) propane, cyclohexane dimethanol and 1,1-bis(hydroxymethyl)cyclohex-3-ene and 4,9-bis(hydroxymethyl)tricyclo[5,2,1,0$^{2.6}$]decane.

Araliphatic diol reactants which may be mentioned are 1,4-benzenedimethanol and 4,4$^1$-bis(hydroxymethyl)biphenyl.

Specific examples of preferred aliphatic trihydroxy compounds reactants of formula I (where n=3) include glycerol, higher polyethylene glycols based on glycerol, higher polyoxypropylene glycols based on glycerol and polycaprolactone triols also based on glycerol.

Specific examples of preferred aliphatic tetrahydroxy compounds reactants of formula I (where n=4) include pentaerythritol, higher polyethylene glycols based on pentaerythritol and higher polyoxypropylene glycols based on pentaerythritol.

Specific examples of preferred aliphatic multihydroxy compounds of formula I (where n>4) include a range of dendritic polyols produced by Perstorp Polyols and sold under the Trade Name BOLTORN (TM) Dendritic Polymers. These include BOLTORN H20, H30, H40 and H50 (OH functionalities =16, 32, 64 and 128 respectively; and Molecular Weights =1800, 3600, 7200 and 14400 respectively).

In a preferred embodiment of the process the multifunctional hydroxy compound is selected from the group consisting of pentaerythritol ethoxylate, polyethylene glycol, polytetrahydrofuran, polycaprolactone diol or triol, tripropylene glycol, glycerol propoxylate and dendritic polyols.

The ratio of the oxetane (I) to cycloaliphatic epoxy (II) to multifunctional hydroxy compounds (III) falls within the ranges from 2:1:1 to 300:15:1, more preferably 7.5:1.5:1 to 150:10:1, most preferably 14:2:1 to 91:7:1.

Such compositions which obey the above criteria and when formulated additionally with a cationic photoinitiator show faster cure speed under UV light at lower levels of photoinitiator when compared with formulations containing no oxetane or oxetane containing formulations which contain cycloaliphatic epoxy compounds or multifunctional hydroxy compounds alone. These systems allow for the formulation of fast curing systems with low levels of photoinitiator which gives cured products with low corrosion on sensitive metals such as thin aluminium films, especially after exposing such covered films to high levels of humidity and temperature for extended periods of time. Such systems can alternatively be used to formulate resins which can be used for a stereolithography process where lasers are used to produce 3-dimensional objects for prototyping applications.

A particularly preferred embodiment relates to a curable composition comprising a) at least one oxetane compound of the formula I selected from the group consisting of 3,3'-[1,4- phenylene-bis(methyleneoxymethylene)]-bis(3-ethyloxetane), 3-methyl-3-oxethanemethanol and 3-ethyl-3-oxethanemethanol;

b) at least one polyfunctional cycloaliphatic epoxy compound of the formula 11 selected from the group consisting of 7-oxabicyclo[4.1.0]hept-3-ylmethyl ester-7-oxabicyclo[4.1.0]heptane-3–Carboxylic acid, 2,2-oxy-bis(6-oxabicyclo[3.1.0]hexane), bis(7-oxabicyclo[4.1.0]hept-3-yl)-methyl ester hexanedioic acid, 3,3'-(dioxane-2,5-diyl)-bis(7-oxabicyclo[4.1.0]heptane) and 2,2-bis[(7-oxabicyclo[4.1.0]hept-3-ylcarbonyloxy)-methyl]-1,3-propanediyl ester-7-oxabicyclo[4.1.0]heptane-3-Carboxylic acid;

c) a multifunctional hydroxy compound selected from the group consisting of pentaerythritol ethoxylate, polyethylene glycol, polytetrahydrofuran, polycaprolactone diol or triol, tripropylene glycol, glycerol propoxylate and dendritic polyols; and d) at least one curing agent.

An especially preferred embodiment of the invention relates to a curable composition comprising An especially preferred embodiment of the invention relates to a curable composition comprising a) at least one oxetane compound;
b) at least one polyfunctional cycloaliphatic epoxy compound of the formula II selected from the group consisting of 7-oxabicyclo[4.1.0]hept-3-ylmethyl ester-7-oxabicyclo [4.1.0]heptane-3-carboxylic acid and bis(7-oxabicyclo [4.1.0]hept-3-yl)-methyl ester hexanedioic acid;
c) a multifunctional hydroxy compound selected from the group consisting of pentaerythritol ethoxylate, polyethylene glycol, polytetrahydrofuran, polycaprolactone diol or triol, tripropylene glycol, glycerol propoxylate and dendritic polyols; and
d) at least one curing agent.

The curable composition may also contain suitable plasticisers such as dibutyl phthalate and dioctyl phthalate, inert diluents such as tar and bitumen and so-called reactive diluents, especially monoepoxides, such as n-butyl glycidyl ether, iso-octyl glycidyl ether, phenyl glycidyl ether, cresyl glycidyl ethers, glycidyl esters of mixed tertiary, aliphatic, monocarboxylic acids, glycidyl acrylate and glycidyl methacrylate. They may also contain additives such as fillers, reinforcing materials, polymeric toughening agents such as polyether sulphones, phenoxy resins, and butadiene-acrylonitrile rubbers, colouring matter, flow control agents, adhesion promotors, flame inhibitors, and mould lubricants. Suitable extenders, fillers and reinforcing materials are for example, glass fibres, carbon fibres, fibres of aromatic polyamides, ballotini, mica, quartz flour, calcium carbonate, cellulose, kaolin, wollastonite, colloidal silica having a large specific surface area, powdered polyvinyl chloride and powdered polyolefin hydrocarbons such as polyethylene and polypropylene.

The present invention also relates to a process for preparing a curable composition, which comprises
α) treating a composition comprising
  a) at least one oxetane compound;
  b) at least one polyfunctional cycloaliphatic epoxy compound; and
  c) at least one multifunctional hydroxy compound; with
β) an ultraviolet (UV) curable curing agent.

The invention also relates to the use of the curable compositions defined above as adhesives, primers for adhesives, laminating and casting resins, moulding compositions, putties and sealing compounds, potting and insulation compounds, as coatings or stereolithographic type applications.

The process defined above is performed in a manner known per se. With respect to the cure of the present invention with UV curing agents, any compound that acts as cationic photoinitiator and generates an acid on exposure to actinic irradiation may be used for the preparation of the compositions of the invention. The acid generated may be a so-called Lewis acid or a so-called Broensted acid.

Suitable acid generating compounds include so-called onium salts and iodosyl salts, aromatic diazonium salts, metallocenium salts, o-nitrobenzaldehyde, the polyoxymethylene polymers described in U.S. Pat. No. 3,991,033, the o-nitrocarbinol esters described in U.S. Pat. No. 3,849,137, the o-nitrophenyl acetals, their polyesters, and end-capped derivatives described in U.S. Pat. No. 4,086,210, sulphonate esters of aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253.

Suitable aromatic onium salts include those described U.S. Pat. Nos. 4,058,400 and 4,058,401. Suitable aromatic sulphoxonium salts which can be used include those described in U.S. Pat. Nos. 4,299,938, 4,339,567, 4,383,025 and 4,398,014. Suitable aliphatic and cycloaliphatic sulphoxonium salts include those described in European Patent Application Publication No. EP-A-0 164 314. Aromatic iodonium salts which can be used include those described in British Patent Specification Nos. 1 516 351 and 1 539 192. Aromatic iodosyl salts which can be used include those described in U.S. Pat. No. 4,518,676.

When the acid generating compound is an aromatic diazonium ion, the aromatic group may be unsubstituted or substituted by one or more arylthio, aryloxy, dialkylamino, nitro, alkyl or alkoxy group.

When R is a methallocenium ion, the initiator may have the formula

$$[(R^1)(R^2M)_a]^{+an}(an/q)[LQ_m]^{-q} \quad (IV),$$

wherein a is 1 or 2, each of n and q independently of the other is an integer from 1 to 3, M is the cation of a monovalent to trivalent metal from groups IVb to VIIb, VIII or Ib of the Periodic Table, L is a divalent to heptavalent metal or non metal, Q is a halogen atom or one of the groups Q may be a hydroxyl group, m is an integer corresponding to the valency of L+q, $R^1$ is a π-arene and $R^2$ is a π-arene or the anion of a π-arene.

Examples of sulphonate esters of aromatic alcohols containing a carbonyl group in a position alpha or beta to the sulphonate ester group and aromatic N-sulphonyloxyimides are those descried in U.S. Pat. No. 4,618,564, preferably esters of benzoin or alpha-methyloibenzoin, especially benzoin phenyl sulphonate, benzoin-p-toluene sulphonate and 3-(p-toluenesulphonyloxy)-2-hydroxy-2-phenyl-1-phenyl-1 -propanone, and N-sulphonyloxy derivatives of 1,8-naphthalimide, particularly N-benzenesulphonyloxy-and N-(p-dodecylbenzenesulphonyloxy)-1,8-naphthalimide.

Examples of aromatic oxime sulphonates are those described in European Patent Application Publication No. 0 199 672 or non-reactive derivatives of the reactive oxime sulphonates described in the cited publication. Particularly preferred oxime sulphonates are those of formula

$$R^3—C(R^4)=N—O—SO_2—R^5 \quad (V),$$

wherein one of $R^3$ and $R^4$ denotes a monovalent aromatic group, especially phenyl or 4-methoxyphenyl, while the other denotes cyano, or $R^3$ and $R^4$, together with the carbon atom to which they are attached, form a carbocyclic or heterocyclic group, especially a fluorene or anthrone ring system, and $R^5$ denotes an aliphatic, carbocyclic, heterocyclic or araliphatic group, especially 4-tolyl, 4-Chlorophenyl or 4-dodecylphenyl.

The oxime sulphonates can be prepared as described in the above-mentioned EP-A-0 199 672. The particularly preferred materials can be prepared by reacting an oxime of formula $R^3—C(R^4)=NOH$ with a sulphonyl chloride of formula $R^5SO_2Cl$, usually in an inert organic solvent in the presence of a tertiary amine.

Examples of quinone diazide compounds include o-benzoquinone diazide sulphonyl or o-naphthoquinone diazide sulphonyl esters or amides of compounds, particularly aromatic compounds, having a hydroxy group or amino group respectively. Preferred are o-quinone diazides such as o-benzoquinione diazide sulphonyl and o-naphthoquinone diazide sulphonyl esters of phenols, including monohydric phenols and, particularly, polyhydric phenols such as 2,2-bis(hydroxyphenyl)propanes, dihydroxydiphenyls, di-and tri-hydroxy-substituted benzophenones, and phenolic resins, including phenol-aldehyde resin and polymers of phenols having polymerisable unsaturated substituents.

Examples of o-nitrophenyl acetals are those prepared from an o-nitrobenzaldehyde and a dihydric alcohol, polyesters of such acetals prepared by reaction of the acetals with a polycarboxylic acid or reactive derivative thereof such as an anhydride, and end-capped derivatives of such acetals prepared by reacting the acetals with a carboxylic acid or reactive derivative thereof. Preferred are acetals derived from o-nitrobenzaldehyde and a linear alkylene glycol in which the alkylene group has 4 to 15 carbon atoms which may be interrupted by at least one oxygen atom, or a glycol or a cycloalkylenealkylene glycol, and polyester and end-capped derivatives of such acetals.

Preferred linear glycols from which the acetals may be derived are 1,4-butanediol, 1,5-pen-tanediol, 1,6-hexanediol, 1,7-heptanediol, diethylene and dipropylene glycols and triethylene and tripropylene glycols. Preterred glycols having a cycloaliphatic ring are 2,2,4,4-tetramethyl-1,3–Cyclobutanediol, bis(4-hydroxycyclohexyl)methane, 1,4–Cyclohexanediol, 1,2-bis(hydroxymethyl)-cyclohexane and, especially, 1,4-bis(hydroxymethyl)cyclohexane.

Examples of polyesteracetals are those prepared by reaction of the preferred acetals described above with an aromatic dicarboxylic or tricarboxylic acid or anhydride thereof, such as phthalic, terephthalic and trimellitic acids and their anhydrides, and mixtures of two or more thereof. An especially preferred polyesteracetal is that prepared by reacting an acetal derived from o-nitrobenzaldehyde and 1,4-bis(hydroxymethyl)cyclohexane with trimellitic arhydride. Preferred end-capped polyacetals are those prepared by reaction of the preferred acetals described above with monobasic carboxylic acid or reactive derivative thereof, such as acetic and benzoic acids and their chlorides.

The amount of the UV curing agent or cationic photoinitiator may be varied over a range depending on the photoinitiator used as is understood by those skilled in the art and varies from 0.01% to 3% or especially 0.1 to 1%. Where such photoinitiators are used, it may be desirable to add a small amount (0.1 to 10 parts by weight, per 100 parts of component 2)) of a sensitiser such as isopropyl-9H- thioxanthen-9-one (ITX) to accelerate the cure.

The curable compositions may contain other curable groups e.g. acrylates and methacrylates which can cured by UV radical initiators e.g. IRGACURE 184 (™) as long as the two types of initiator systems do not interfere with each other.

The Following Examples Illustrate the invention:

Studies on the UV cure properties are undertaken using a Differential Photocalorimeter (DPC) attachment on a 2920 Differential Scanning Calorimeter (DSC) supplied by TA Instruments.

An accurately weighed sample of 10(+/−1)mg is placed in aluminium pan, warmed to 30° C. and irradiated for 5 minutes with UV light at 60 mW/cm². After irradiation the sample is allowed to stand for 1 minute then warmed to 30° C. and then irradiated again to generate the baseline. The baseline is electronically removed from the first run to generate a trace of Heat Flow (W/g) against Time (minutes). The peak exotherm (W/g) so obtained (to the nearest 0.5W/g) is used as a measure of the cure speed for each system under test. Where the higher the value obtained the faster the reaction is proceeding under the action of UV light. The total heat generated (J/g) is a measure of the amount of cure obtained for each system under test.

Where in all cases the ratios are adjusted to show oxetane (OX): cycloaliphatic epoxy (EP): alcohol (OH); CYRACURE UVI 6990 (™) is a mixed triarylsuiphonium hexafluorophosphate salt supplied as a 50% solution in propylene carbonate by Union Carbide; CYRACURE UVI 6974 (™) is a mixed triarylsulphonium hexafluoroantimonate salt supplied as a 50% solution in propylene carbonate by Union Carbide; TPG is tri(propylene glycol); polyTHF (1000) is a polytetrahydrofuran polymer of a molecular weight of 1000; polyTHF (2000) is a polytetrahydrofuran polymer of a molecular weight of 2000; CAPA 200 (™) is a polycaprolactone diol of molecular weight of 550 supplied by Solvay Interox; CAPA 305 (™) is a polycaprolactone triol of a molecular weight 540 supplied by Solvay Interox; BDMA is butanediol monoacrylate supplied by BASF; IRGACURE 184 (™) is 1-hydroxycyclohexyl phenyl ketone supplied by Ciba Specialty Chemicals;

Compound F:
3,3-[1,4-phenylene-bis(methyleneoxymethylene)]-bis(3-ethyloxetane);

Compound G:
3-Methyl-3-oxethanemethanol;

Compound H:
3-Ethyl-3-oxethanemethanol;

Compound A:
7-oxabicyclo[4.1.0]hept-3-ylmethyl ester-7-oxabicyclo [4.1.0]heptane-3carboxylic acid;

Compound B:
2,2'-oxy-bis(6-oxabicyclo[3.1.0]hexane);

Compound C:
bis(7-oxabicyclo[4.1.0]hept-3-yl)-methyl ester hexanedioic acid;

Compound D:
3,3'-(1,3-dioxane-2,5-diyl)-bis(7-oxabicyclo[4.1.0]heptane)

Compound E:
2,2-bis[(7-oxabicyclo[4.1.0]hept-3-ylcarbonyloxy)-methyl]-1 ,3-propanediyl ester-7-oxabicyclo[4.1.0]heptane-3–Carboxylic acid % means percent by weight if not indicated otherwise.

EXAMPLE 1

Peak Exotherm Against Oxetane to Cycloaliphatic Epoxy to Alcohol Ratio at 1% CYRACURE UVI 6990 Concentration (50% Propylene Carbonate)

The following formulations were prepared by mixing the ingredients at room temperature to give clear solutions.

| Compound F (%) | 88 | 92 | 89 | 81 | 78 | 72 | 64 |
| Compound A (%) | 7 | 5 | 7 | 13 | 16 | 20 | 26 |

-continued

| | | | | | | | |
|---|---|---|---|---|---|---|---|
| TPG (%) | 4 | 2 | 3 | 5 | 5 | 7 | 9 |
| UVI 6990 (%) | 1 | 1 | 1 | 1 | 1 | 1 | 1 |
| Compound F (OX):Compound A (EP):TPG (OH) | 11.8:1.2:1 | 25.6:1.8:1 | 15.8:1.6:1 | 8.8:1.8:1 | 8.4:2.2:1 | 5.6:2.0:1 | 3.8:2.0:1 |
| Peak Exotherm (W/g) | 16.0 | 18.5 | 20.5 | 20.0 | 17.5 | 17.0 | 18.0 |

EXAMPLE 2

Peak Exotherm Against Oxetane to Cycloaliphatic Epoxy to Alcohol Ratio at 1% CYRACURE UVI 6990 Concentration (50% Propylene Carbonate)

| | | | | |
|---|---|---|---|---|
| Compound F (%) | 83 | 89 | 88 | 85 |
| Compound A (%) | 13 | 7 | 7 | 7 |
| CAPA (200) (%) | 3 | 3 | 4 | 7 |
| UVI 6990 (%) | 1 | 1 | 1 | 1 |
| Compound F (OX):Compound A (EP):CAPA (200) (OH) | 44.0:8.8:1 | 46.5:4.7:1 | 35.3:3.6:1 | 19.0:2.0:1 |
| Peak Exotherm (W/g) | 21.0 | 20.0 | 22.0 | 19.0 |

EXAMPLE 3

Peak Exotherm Against Oxetane to Cycloaliphatic Epoxy to Alcohol Ratio at 1% CYRACURE UVI 6974 Concentration (50% Propylene Carbonate)

| | | | |
|---|---|---|---|
| Compound F (%) | 81 | 83 | 84 |
| Compound A (%) | 13 | 13 | 13 |
| Benzyl alcohol (%) | 5 | 3 | 2 |
| UVI 6974 (%) | 1 | 1 | 1 |
| Compound F (OX):Compound A (EP):Benzyl alcohol (OH) | 10.3:2.1:1 | 17.0:3.4:1 | 26.0:5.2:1 |
| Peak Exotherm (W/g) | 28.0 | 29.0 | 27.0 |

EXAMPLE 4

Peak Exotherm Against Oxetane to Cycloaliphatic Epoxy to Alcohol Ratio at Various CYRACURE UVI 6990 Concentration (50% Propylene Carbonate)

| | | | | |
|---|---|---|---|---|
| Compound F (%) | 70 | 69.9 | 69.5 | 69 |
| Compound C (%) | 15 | 15 | 15 | 15 |
| PolyTHF (1000) (%) | 15 | 15 | 15 | 15 |
| UVI 6990 (%) | 0.0 | 0.1 | 0.5 | 1.0 |
| Compound F (OX):Compound C (EP):PolyTHF (1000) (OH) | 13.4:2.8:1 | 13.4:2.8:1 | 13.4:2.8:1 | 13.4:2.8:1 |
| UVI 6990 (%) | 0.0 | 0.1 | 0.5 | 1.0 |
| Peak Exotherm (W/g) | 0.0 | 11.5 | 15.5 | 20.0 |

EXAMPLE 5

Peak Exotherm Against Oxetane to Cycloaliphatic Epoxy to Alcohol Ratio at Either 5% or 0.5% CYRACURE UVI 6990 Concentration (50% Propylene Carbonate).

| | Formulation 1 | Formulation 2 |
|---|---|---|
| Compound F (%) | 85.5 | 82 |
| Compound A (%) | 9 | 9 |
| CAPA 305 (%) | 4 | 4 |
| UVI 6990 (%) | 0.5 | 5 |
| Compound F (OX):Compound A (EP):CAPA 305 (OH) | 21.5:2.9:1 | 20.6:2.9:1 |
| Peak Exotherm (W/g) | 20.0 | 22.0 |

Both the above formulations are used to either bond 0.6mm polycarbonate to 0.6 mm aluminium (50 nm) coated polycarbonate (25×25 mm overlap) or coat (25 mm) 0.6 mm aluminium (50 nm) coated polycarbonate test pieces (25×30 mm area). Both samples are cured by passing twice under a Fusion UV lamp (D bulb) at 10 m/min.

The test samples are allowed to stand at Room Temperature (RT) for 1 day and are then aged for 4 days in an oven at 80° C. and 95% Relative Humidity (RH).

For the bonded samples, Formulation 1 show no signs of either loss or thinning of the aluminium layer, whereas Formulation 2 show both thinning and complete removal of the aluminium at the top and bottom edges of the test sample.

For the coated samples Formulation 1 show no signs of loss or thinning of the aluminium layer, whereas Formulation 2 show significant thinning.

EXAMPLE 6

Peak Exotherm Against Oxetane to Cycloaliphatic Epoxy to Acrylate Containing Alcohol Ratio at Either 6% or 3% CYRACURE UVI 6990 Concentration (50% Propylene Carbonate) and 1% or 3% IRGACURE 184 Concentrations.

| | Formulation 3 | Formulation 4 |
|---|---|---|
| Compound F (%) | 74 | 75 |
| Compound A (%) | 12 | 12 |
| BDMA (%) | 7 | 7 |
| CYRACURE UVI 6990 (%) | 6 | 3 |
| IRGACURE 184 (%) | 1 | 3 |
| Compound F (OX):Compound A (EP):BDMA (OH) | 8.6:1.8:1 | 8.8:1.8:1 |
| Peak Exotherm (W/g) | 25.0 | 16.0 |

Formulation 3 and Formulation 4 are further tested as described in Example 5. For the bonded samples Formulation 3 show major thinning and total removal of over half the aluminium layer, whereas Formulation 4 show only thinning of the aluminium. For the coated samples Formulation 3 show both thinning and removal of about 5% of the aluminium, whereas Formulation 4 only show some slight thinning.

EXAMPLE 7

Peak Exotherm Against Oxetane to Cycloaliphatic EPoxy to Alcohol Ratio at Either 5% or 1% CYRACURE UVI 6990 Concentration (50% Propylene Carbonate).

|  | Formulation 5 | Formulation 6 |
|---|---|---|
| Compound F (%) | 78 | 75 |
| Compound C (%) | 9 | 9 |
| PolyTHF (1000) (%) | 12 | 11 |
| CYRACURE UVI 6990 (%) | 1.0 | 5.0 |
| Compound F (OX):Compound C (EP):PolyTHF (1000) (OH) | 17.8:2.0:1 | 17.2:2.0:1 |
| Peak Exotherm (W/g) | 13 | 14 |

Formulations 5 and 6 are used to prepare bonded samples as described for Example 5. Formulation 5 show some slight thinning and removal of the aluminium but only where it had been shaded from the UV light during the cure, whereas Formulation 6 show major thinning and removal of almost half of the aluminium layer.

EXAMPLE 8

Peak Exotherm Against Oxetane to Cycloaliphatic Epoxy to Alcohol Ratio at 1% CYRACURE UVI 6974 Concentration (50% Propylene Carbonate).

|  | Formulation 7 | Formulation 8 | Formulation 9 |
|---|---|---|---|
| Compound F (%) | 81 | 77 | 72 |
| Compound A (%) | 8 | 6 | 6 |
| PolyTHF (2000) (%) | 10 | 16 | 21 |
| UVI 6974 (%) | 1 | 1 | 1 |
| Compound F (OX):Compound A (EP):PolyTHF (2000) (OH) | 45.8:5.8:1 | 27:2.7:1 | 19.7:2.1:1 |
| Peak Exotherm (W/g) | 30.0 | 21.5 | 22.0 |

The 3-Point Bend test samples are generated on a SLA-250/30 using the HeCad 324 laser. after the parts have been built they are measured for flexural modulus, at 1 mm deflection, after standing for the conditions as shown below:

|  | Formulation 7 | Formulation 8 | Formulation 9 |
|---|---|---|---|
| Flexural Modulus (MPa) after 10 min | 1220 | 620 | 495 |
| Flexural Modulus (MPa) after 60 min | 1370 | 660 | 525 |
| After UV Post Cure | 1150 | 690 | 580 |
| After UV Post Cure + 24 hrs. at RT | 1150 | 710 | 630 |

The Dog Bone test pieces are generated on a SLA-250/30 using the HeCad 324 laser. After the parts have been built they are washed in tripropylene glycol monomethyl ether (TPM) for 20 minutes, rinsed with water and dried with compressed air. The samples are placed on a revolving turntable in a UV curing oven for 90 minutes and then allowed to stand, at RT for 24 hours, before being tested.

|  | Formulation 7 | Formulation 8 | Formulation 9 |
|---|---|---|---|
| Elongation at Break (%) | 3.1 | 6.6 | 9.8 |
| Break Strength (MPa) | 26.8 | 22.3 | 16.3 |
| Tensile Modulus (MPa) | 1310 | 966 | 690 |
| Heat Deflection Temp. (° C.) | 54 | 48 | 42 |

EXAMPLE 9

Peak Exotherm Against Combinations of Oxetane, Cycloaliphatic Epoxy and Alcohol at 1% Cyracure UVI 6990 Concentration (50% Propylene Carbonate).

|  | Form. 10 | Comp. 10a | Comp. 10b | Comp. 10c | Comp. 10d* |
|---|---|---|---|---|---|
| Compound F (%) | 81 | 85 | 93 | 0 | 81 |
| Compound A (%) | 13 | 14 | 0 | 72 | 0 |
| Epolead PB3600 (%) | 0 | 0 | 0 | 0 | 13 |
| TPG (%) | 5 | 0 | 6 | 27 | 5 |
| UVI 6990 (%) | 1 | 1 | 1 | 1 | 1 |
| Peak Exotherm (W/g) | 20.6 | 16.9 | 0.2 | 15.0 | 6.9 |

Epolead PB3600 is an epoxidised Polybutadiene diol supplied by Daicel Chemical Industry Co. Ltd
*according to prior art reference EP-A-0 848 294

Epolead PB3600 is an epoxidised Polybutadiene diol supplied by Daicel Chemical Industry Co. Ltd

*according to prior art reference EP-A-0 848 294

Example 9 shows that the peak exotherm as a measure of the cure speed is greater with the combination of oxetane, cycloaliphatic epoxy and polyol (Form. 10) rather than with a combination of just two of the components alone (Comp. 10a, b, c). This is particularly surprising in the light of the effect that the polyol has on the cure of the oxetane alone where a reaction is almost non-existent (Comp. 10b).

The invention claimed is:

1. A curable composition consisting essentially of:
   a) at least one oxetane compound of the formula

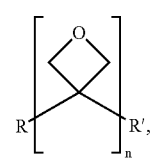

(1)

wherein R and R' independently of one another represent aliphatic, cycloaliphatic or aralphatic groups and n represents an integer from one to four;

b) at least one polyfunctional cycloaliphatic epoxy compound containing a group of the formula

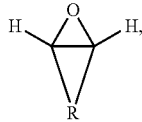
(II)

wherein R is a straight chain $C_2$–$C_6$ alkylene group;

c) at least one multifunctional hydroxy compound $$Q(OH)_n \quad (III),$$

in which Q represents an aliphatic, cycloaliphatic or araliphatic group and n an integer from 2 up to 128;

d) at least one curing agent; and
e) at least one acrylate or methacrylate compound.

2. A curable composition consisting essentially of:
a) at least one oxetane compound selected from the group consisting of 3,3-[1,4-phenylene-bis(methyleneoxymethylene)]-bis(3-ethyloxetane), 3-methyl-3-oxethanemethanol and 3-ethyl-3-oxethanemethanol;
b) at least one polyfunctional cycloaliphatic epoxy compound selected from the group consisting of 7-oxabicyclo[4.1.0]hept-3-ylmethyl ester-7-oxabicyclo[4.1.0]heptane-3-carboxylic acid, 2,2'-oxy-bis(6-oxabicyclo[3.1.0]hexane), bis(7-oxabicyclo[4.1.0]hept-3-yl) methyl ester hexanedioic acid, 3,3'-(dioxane-2,5-diyl)-bis(7-oxabicyclo[4.1.0]heptane) and 2,2-bis(7-oxabicyclo[4.1.0]hept-3-ylcarbonyloxy)-methyl]-1,3-propanediyl ester-7-oxabicyclo[4.1.0]heptane-3-carboxylic acid;
c) a multifunctional hydroxy compound selected from the group consisting of pentaerythritol ethoxylate, polyethylene glycol, polytetrahydrofuran, polycaprolactone diol or triol, tripropylene glycol, glycerol propoxylate and dendtric polyols;
d) at least one curing agent; and
e) at least one acrylate or methacrylate compound.

3. A curable composition consisting essentially of:
a) at least one oxetane compound;
b) at least one polyfunctional cycloaliphatic epoxy selected from the group consisting of 7-oxabicyclo[4.1.0]hept-3-ylmethyl ester-7-oxabicyclo[4.1.0]heptane-3-carboxylic acid and bis(7-oxabicyclo[4.1.0]hept-3-yl)-methyl ester hexanedioic acid;
c) a multifunctional hydroxy compound selected from the group consisting of pentaerythritol ethoxylate, polyethylene glycol, polytetrahydrofuran, polycaprolactone diol or triol, tripropylene glycol, glycerol propoxylate and dendtric polyols;
d) at least one curing agent; and
e) at least one acrylate or methacrylate compound.

* * * * *